United States Patent
Kim et al.

(10) Patent No.: US 7,394,548 B2
(45) Date of Patent: Jul. 1, 2008

(54) HETERODYNE LASER INTERFEROMETER USING HETEROGENOUS MODE HELIUM-NEON LASER AND SUPER HETERODYNE PHASE MEASURING METHOD

(75) Inventors: Seung-Woo Kim, Daejon (KR); Min-Seok Kim, Kyunggi (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 274 days.

(21) Appl. No.: 10/519,469

(22) PCT Filed: Jul. 15, 2002

(86) PCT No.: PCT/KR02/01330

§ 371 (c)(1),
(2), (4) Date: Dec. 27, 2004

(87) PCT Pub. No.: WO2004/003526

PCT Pub. Date: Jan. 8, 2004

(65) Prior Publication Data

US 2005/0264821 A1    Dec. 1, 2005

(30) Foreign Application Priority Data

Jun. 27, 2002    (KR) .................... 10-2002-0036184

(51) Int. Cl.
*G01B 9/02*    (2006.01)

(52) U.S. Cl. ..................................... 356/487

(58) Field of Classification Search .......... 356/484–487
See application file for complete search history.

(56) References Cited

U.S. PATENT DOCUMENTS

| | | | | |
|---|---|---|---|---|
| 4,498,773 A | | 2/1985 | von Bieren | 356/360 |
| 5,054,912 A | * | 10/1991 | Kuchel | 356/5.11 |
| 5,106,191 A | * | 4/1992 | Ohtsuka | 356/487 |
| 5,274,436 A | * | 12/1993 | Chaney | 356/487 |
| 5,412,474 A | * | 5/1995 | Reasenberg et al. | 356/486 |
| 5,579,109 A | | 11/1996 | Suh et al. | 356/349 |

(Continued)

FOREIGN PATENT DOCUMENTS

JP    2001-156361    6/2001

(Continued)

*Primary Examiner*—Patrick Connolly
*Assistant Examiner*—Scott M Richey
(74) *Attorney, Agent, or Firm*—Meyer & Williams PC; Stuart H. Mayer, Esq.; Kevin L. Williams, Esq.

(57) ABSTRACT

In the method and a device for detecting the phase of a moving object using a heterodyne interferometer, a heterogeneous mode helium-neon laser is used as a direct light source to increase a measuring speed, a measuring resolution, and minimize the loss of the light source. Signals, which have only a frequency difference between reference signals or measured signals and arbitrary signals, are extracted from signals which are obtained by multiplying the arbitrary frequency signals by the reference or measured signals. After frequencies of the reference and measured signals are converted, a phase difference of the extracted signals and displacement of the moving object is measured. The system includes a laser light source, an optical interferometer, a frequency converter, and a phase measurer. The light source uses output light, emitted from the laser generator, which is stabilized in frequency, and has two frequencies which are at right angles to each other and linearly polarized.

1 Claim, 3 Drawing Sheets

U.S. PATENT DOCUMENTS

| | | | |
|---|---|---|---|
| 5,677,768 A * | 10/1997 | Bockman | 356/487 |
| 5,784,161 A * | 7/1998 | Bechstein et al. | 356/487 |
| 5,796,482 A * | 8/1998 | Xu et al. | 356/487 |
| 5,818,588 A * | 10/1998 | Matsumoto et al. | 356/487 |
| 6,181,420 B1 * | 1/2001 | Badami et al. | 356/487 |
| 6,573,107 B1 * | 6/2003 | Bowen et al. | 436/518 |
| 6,646,723 B1 * | 11/2003 | Dubovitsky et al. | 356/4.1 |
| 7,009,710 B2 * | 3/2006 | Sullivan et al. | 356/487 |

FOREIGN PATENT DOCUMENTS

| KR | 2001-37162 | 5/2001 |
|---|---|---|

\* cited by examiner

[FIG 1]
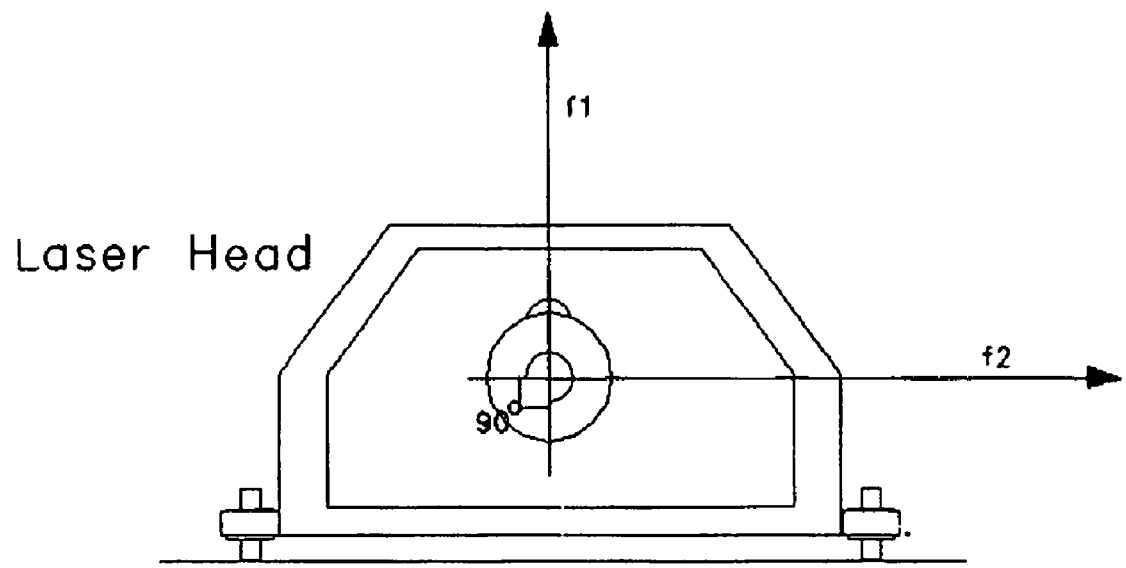
[FIG 2]
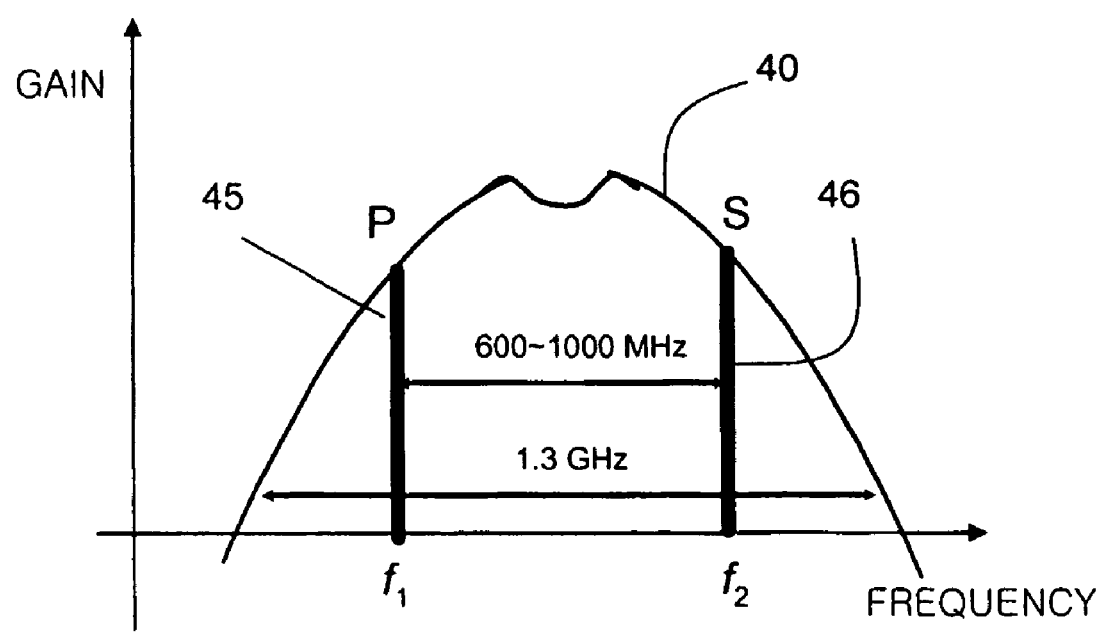

HETERODYNE LASER INTERFEROMETER USING HETEROGENOUS MODE HELIUM-NEON LASER AND SUPER HETERODYNE PHASE MEASURING METHOD

TECHNICAL FIELD

The present invention relates to a method and device for detecting displacement of a moving object using a heterodyne interferometer. Specifically, the invention relates to a method and device for detecting displacement of a moving object, which uses a heterogeneous mode helium-neon laser as a direct light source for a heterodyne interferometer to minimize the loss of the light source, extracts signals, which have only a frequency difference between reference signals or measured signals and arbitrary signals, from signals that are obtained by multiplying the arbitrary frequency signals by the reference signals or the measured signals to increase a measuring speed and a measuring resolution, converts frequencies of the reference signals and the measured signals, and then measures a phase difference of the extracted signals, thereby measuring the displacement of the moving object.

BACKGROUND ART

First of all, the technique and principle of a conventional heterodyne displacement measuring interferometer will be explained hereinafter in order to improve the understanding of the present invention. The present technical situation of a laser light source of the heterodyne interferometer is described first. As implied by the word "heterodyne", a laser light source of the heterodyne interferometer must output light having two frequencies which are at right angles to each other and linearly polarized, as shown in FIG. 1. There are two typical methods for generating this light. The first one is a method using the Zeeman effect, which applies a magnetic field to a gain material to generate two frequencies and the second one is a method using an acousto-optic modulator (hereinafter, referred to as "AOM").

Specifically, the first method applies a magnetic field to a laser operating in a single mode using the Zeeman effect by which the spectrum of an atom is divided into two when a magnetic field is applied to the gain material, to thereby obtain light having two frequencies whose polarized beams are perpendicular to each other. This method can relatively easily construct a heterodyne light source. However, the maximum difference between the two frequencies is merely 3 MHz so that the maximum measuring speed is limited to 475 mm/s when a plane mirror interferometer is used.

The second method for obtaining a light source using an AOM became commercially available by Zygo, Co., of America. This method passes one of two frequencies of light that oscillate in a heterogeneous-mode laser through a polarizer and inputs the resultant frequencies to the AOM to obtain linearly polarized light having two frequency components with a frequency difference of 20 MHz between them. The light source obtained through this method has a high beat frequency so that a measuring band of the light source becomes larger than that of the light source acquired according to the Zeeman effect. Furthermore, even in the case where the beat frequency is stabilized and the laser is changed into another one, the beat frequency can be controlled to be identical to the stabilized one. However, the loss of light is considerable because one of the two frequencies should pass through the polarizer. Moreover, a polarization prism cannot perfectly align two beams with one axis, so measurement becomes difficult when a measuring distance is longer than 10 m.

Next, a phase measuring method and the technical situation of a conventional heterodyne interferometer will be explained. A phase measurer measures a frequency difference between a reference signal having a specific frequency and a measured signal obtained by adding the Doppler frequency to the frequency of the reference signal according to movement of an object and continuously adds up the measured frequency difference, to detect the displacement of the moving object. When a reflecting mirror moves at a rate v, Doppler frequency $\Delta f$ according to the movement of the reflecting mirror is represented by the following Expression:

$$\Delta f = 2nv(t)/\lambda \quad \text{(Expression 1)}$$

where n is the refractive index of air and $\lambda$ is wavelength of light. When the reflecting mirror moves at 1 m/s, the Doppler frequency caused by the movement of the reflecting mirror is 3.16 MHz. In the case of a plane mirror interferometer where light reaches the reflecting mirror twice, the Doppler frequency becomes 6.32 MHz, which is twice the Doppler frequency of the above-described case. This means that $6.32 \times 10^6$ interference patterns pass for one second. The phase measurer must have a high frequency band so as not to miss the number of interference patterns.

The phase measurer mostly measures the ratio of the cycle of the reference signal to a zero crossing time difference of the reference signal and the measured signal, to obtain a phase value. The phase of the two signals is defined as follows:

$$\phi = 360° \times \frac{T_+}{T_R} \quad \text{(Expression 2)}$$

where $T_R$ is the cycle of the reference signal $V_R$, and $T_+$ is the zero crossing time difference of the reference signal $V_R$ and the measured signal $V_m$. The phase measurer counts internal clocks during $T_+$ and $T_R$ to obtain the phase value. Accordingly, the resolution of the phase measurer is determined by the cycle of the reference signal and a time resolution of the phase measurer. That is, the following relationship is accomplished:

$$\Delta\theta = 360° f_R \Delta\tau \quad \text{(Expression 3)}$$

where $\Delta\theta$ is an angle resolution of the phase measurer, $f_R$ is the frequency of the reference signal, and $\Delta\tau$ is the time resolution of the phase measurer. According to Expression 3, the phase resolution becomes 3.6+ when the time resolution of the phase measurer is 1 nsec and the frequency of the reference signal is 10 MHz, and the phase resolution is 0.36° when the frequency of the reference signal is 1 MHz. This means that the phase resolution increases as the frequency of the reference signal decreases. However, the phase resolution is limited by a measuring speed. In general, phase measurement is carried out for every one cycle of the reference signal so that the frequency of the reference signal becomes a sampling frequency of the phase value. When a phase variation is more than ⅔ during one sampling period, phase unwrapping becomes difficult. This can be represented by the following Expression:

$$\Delta\phi < |2\pi/3| \quad \text{(Expression 4)}$$

where $\Delta\phi$ is a phase variation during a sampling period.

The limit of measurable Doppler frequency $\Delta f$ can be obtained when both sides of Expression 4 are divided by sampling time, that is, half the cycle of the reference signal.

$$|\Delta f| = \left|\frac{\Delta \phi}{2\pi\left(\frac{T_R}{2}\right)}\right| < \frac{2}{3} f_R \qquad \text{(Expression 5)}$$

where $f_R$ is the frequency of the reference signal, which is obtained through $f_1 - f_2$.

In the case where the frequency of the reference is 1 MHz and the plane mirror interferometer is used, a maximum measurable movement speed is approximately 104 mm/s from Expressions 1 and 5. Because a maximum movement speed is proportional to the frequency of the reference signal, the frequency of the reference signal should be increased in order to measure an object moving rapidly. In this case, however, resolution is decreased. The relationship between the measuring speed v and a length resolution $\Delta L$ is represented as follows:

$$\Delta \tau < 2\Delta \frac{L}{3v} \qquad \text{(Expression 6)}$$

The conventional phase measuring method must satisfy the relationship of Expression 6. Accordingly, increasing the time resolution is the only way to improve both the measuring speed and the measuring resolution. To obtain the resolution of 0.3 mm at the movement speed of 2 m/s, a time resolution of at least 100 ps is needed. Thus, it is difficult and costly to obtain such resolution.

As described above, the conventional heterodyne interferometer has a large loss of light during generation of the light source so a light source with high power is difficult to obtain. In addition, the time resolution should be increased in order to acquire a high measuring speed and measuring resolution in the conventional heterodyne interferometer. However, there are limits in the time resolution, so it is difficult to actually construct a laser interferometer system.

SUMMARY OF THE INVENTION

Accordingly, the present invention has been made in view of the above-mentioned problems, and it is an object of the present invention is to provide a method and device for detecting displacement of a moving object using a heterodyne interferometer.

To accomplish an object of the present invention, the invention uses a heterogeneous mode helium-neon laser as a direct light source for a heterodyne interferometer to minimize the loss of the light source, extracts signals, which have only a frequency difference between reference signals or measured signals and arbitrary signals, from signals that are obtained by multiplying the arbitrary frequency signals by the reference signals or the measured signals to increase a measuring speed and a measuring resolution, converts frequencies of the reference signals and the measured signals, and then measures a phase difference of the extracted signals, thereby measuring the displacement of the moving object.

It is to be understood that both the foregoing general description and the following detailed description of the present invention are exemplary and explanatory and are intended to provide further explanation of the invention as claimed.

BRIEF DESCRIPTION OF THE DRAWINGS

Further objects and advantages of the invention can be more fully understood from the following detailed description taken in conjunction with the accompanying drawings in which:

FIG. 1 shows a conventional heterodyne displacement measuring interferometer;

FIG. 2 shows a gain curve of a heterogeneous mode HeNe laser;

DETAILED DESCRIPTION OF THE INVENTION

Reference will now be made in detail to the preferred embodiments of the present invention, examples of which are illustrated in the accompanying drawings.

The laser interferometer system of the present invention includes a heterogeneous mode helium-neon laser source used in the interferometer, which is stabilized in frequency, an optical interferometer for generating an interference pattern, a detector for converting the interference pattern into an electric signal, and a phase measurer for measuring the phase of the signal obtained from the detector.

The heterogeneous mode helium-neon laser is a laser that has two modes 45 and 46 satisfying an ordinary wave condition of a resonator whose length is 150 to 200 mm on a gain curve 40 of helium-neon, as shown in FIG. 2, to output light having two frequencies. The distance between the two modes is determined by a free spectral range. The distance between the two modes depends on the length of the resonator but is in the range of 600 to 1000 MHz in general. The two modes are perpendicular to each other and linearly polarized so that one mode is in P polarization state when the other mode is in S polarization state.

An embodiment of the heterodyne displacement measuring laser interferometer using the helium-neon laser according to the present invention will be explained below.

Figure 3:
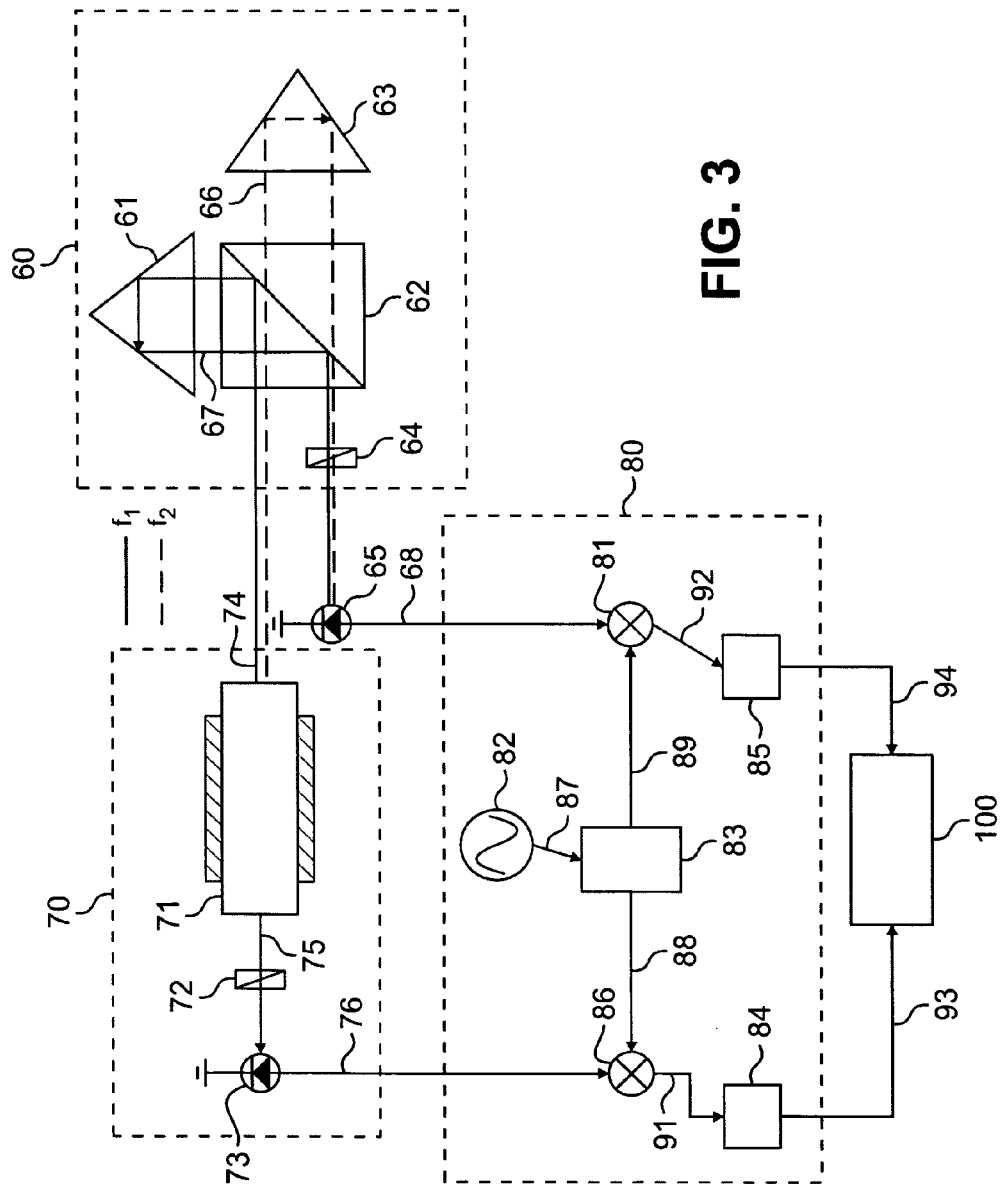
FIG. 3 shows a heterodyne laser interferometer using a heterogeneous mode HeNe (helium-neon) laser and a super heterodyne phase measuring method according to the present invention.

FIG. 3 shows the laser interferometer system of the present invention. The laser interferometer system includes a laser light source part 70, an optical interferometer 60, a frequency converter 80, and a phase measurer 100. The light source used in the heterodyne interferometer uses output light 74 emitted from a heterogeneous mode helium-neon laser generator 71. The output light has two frequencies that are at right angles to each other and linearly polarized. A part 75 of the output light passes through a polarizer 72 whose polarization axis is tilted at 45° to the light to interfere, to be used as a reference signal. The interference light passes through a photo-detector 73 to be converted into an electric signal 76. This electric signal is used as the reference signal to be compared with a measured signal that is inputted to a moving object and outputted from the moving object. The reference signal is represented by the following Expression:

$$V_r = A\cos[2\pi(f_1 - f_2)t] \qquad \text{(Expression 7)}$$

where $V_r$ is the reference signal, A denotes the amplitude of the signal, and $f_1$ and $f_2$ are frequency components included in the output light. The remaining output light 74 emitted from the laser generator 71 is input into a polarization splitter 62, which splits light according to a polarization direction, to be split so that light 67 having the frequency component $f_1$ travels to a fixed reflecting mirror 61 and light 66 having the frequency component $f_2$ travels to a moving reflecting mirror 63 attached to a moving object. The lights input into the fixed reflecting mirror and the moving reflecting mirror are reflected and combined by a polarizer 64 whose polarization axis is tilted at 45° to the lights to interfere with each other, and then input to a photo-detector 65. The light input into the photo-detector is converted into an electric signal 68, which is used as the measured signal. When the light having the frequency component $f_1$ has traveled by $d_1$ in the air, the actual light traveling path is $2nd_1$. When the beam having the frequency component $f_2$ has traveled by $d_2$ in the air, the light traveling path becomes $2nd_2$. Accordingly, the measured signal is represented as follows:

$$V_m = B\cos\{2\pi(f_1-f_2)t + 2nd_1/\lambda_1 - 2nd_2/\lambda_2\} \quad \text{(Expression 8)}$$

where $V_m$ is the measured signal, B is the amplitude of the signal, n is the refractive index of air, and $\lambda_1$ and $\lambda_2$ mean wavelengths of the lights having the frequency components $f_1$ and $f_2$, respectively.

Since the absolute phase value is not important in the interferometer, from Expression 7 representing the reference signal and Expression 8 representing the measured signal, a phase difference between the two signals is obtained as follows:

$$\phi \approx 4\pi n(d_1-d_2)/\lambda_2 \quad \text{(Expression 9)}$$

where $\lambda_1$ and $\lambda_2$ are similar to each other so that it is assumed that they are identical to each other.

The cycle of the measured signal 68 is varied by the Doppler effect according to a moving speed and movement direction of the moving reflecting mirror 63 whereas the cycle of the reference signal 76 is uniform. The displacement of the moving object to which the moving reflecting mirror is attached can be measured by continuously measuring a relative phase difference between the reference signal and the measured signal.

A measurement resolution is determined according to a degree of resolution of the phase difference between the two signals. As described above, the heterogeneous mode helium-neon laser has two modes and its resonator has a length of 150 to 200 mm. The distance between the two modes is determined by a free spectral range. The distance depends on the length of the resonator but is in the range of 600 to 1000 MHz in general. If the wavelength of laser beam is 633 nm, in order to obtain the measurement resolution of 0 nm, the phase measuring resolution of 2×360°×(0.1 nm)/633 nm=0.1° is required when Expression 9 is applied. However, this small phase is difficult to directly measure using a phase meter. To solve this problem, the present invention reduces the frequencies of the reference signal and the measured signal without changing the phases of the two signals by using a super heterodyne technique, to thereby enable phase measurement even if beat frequencies of the signals are high.

A method capable of increasing the measurement resolution will be explained below.

A local oscillator 82 artificially creates a local signal 87 approximate to the beat frequency corresponding to the reference signal. To apply the local signal to the measured signal and the reference signal, a signal splitter 83 splits the local signal 87 into two signals 88 and 89. Though it is desired that the local signal 87 differ from the beat frequency by 1 MHz to 20 MHz, it is determined according to the configuration of the system. Mixers 86 and 81 multiply the split signals 88 and 89 by the reference signal 76 and the measured signal 68, respectively. The mixers 86 and 81 output signals 91 and 92 corresponding to the sums of the frequencies of the multiplied two signals and the differences of the frequencies of the multiplied two signals. The signals corresponding to the sums are eliminated by filters 84 and 85. Outputs 93 and 94 of the filters 84 and 85 are input to a phase measurer 100 to measure their phases. The reference signal 93 and the measured signal 94 whose frequencies are reduced can be represented as follows:

$$V_m' = A\cos 2\pi f t \quad \text{(Expression 10)}$$

$$V_m' = B\cos\{2\pi(ft + 2nd_1/\lambda_1 - 2nd_2/\lambda_2)\} \quad \text{(Expression 11)}$$

where $f=f_1-f_2-f_{LO}$ where $f_{LO}$ is the frequency of a local oscillation signal. When $f_{LO}$ is set similar to the beat frequency, the beat signal frequency can be reduced to the measuring band of the phase measurer. Since $f_{LO}$ can be varied, the frequencies of the reference signal and the measured signal can be controlled according to a speed and a resolution of an object to be measured. A heterogeneous mode laser outputs power of more than 2 mW. Accordingly, if the efficiency of the plane mirror interferometer is 60% and a minimum measurable light intensity is 50 mW, the interferometer can measure at least 20 axes when the heterogeneous mode laser is used as a light source of the interferometer.

Figure 4A:
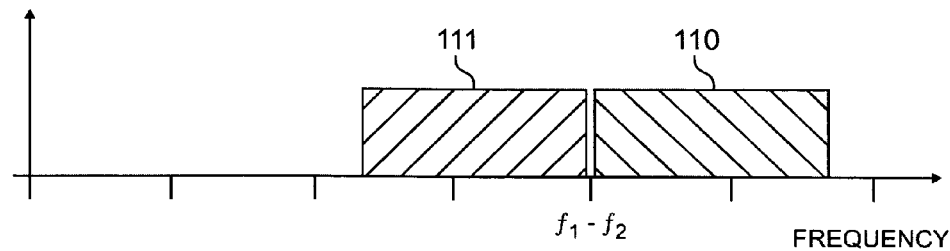
FIG. 4A shows a measuring band when a beat frequency is not decreased.
Figure 4B:
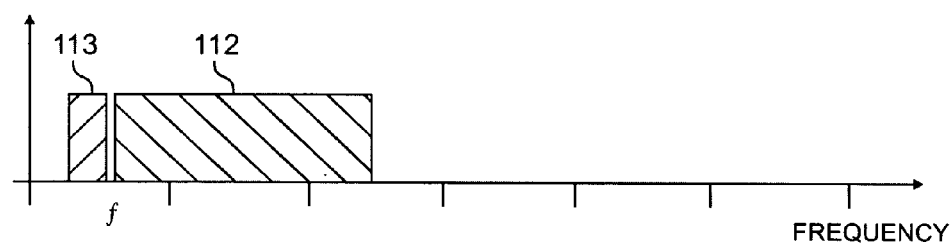
FIG. 4B shows a measuring band when Doppler frequency operates in positive and negative directions.

When the reference signal frequency is reduced, however, the measuring band is limited. FIG. 4A shows the measuring band when the beat frequency is not decreased, in which the bandwidth in the case 110 where the Doppler frequency operates in a positive direction is the same as the bandwidth in the case 111 where the Doppler frequency operates in a negative direction. When the beat frequency is reduced, although a band 112 is not varied when the Doppler frequency operates in the positive direction, a measuring band 113 becomes narrow in the negative direction, as shown in FIG. 4B. To solve this, the present invention uses a two-way heterodyne technique.

Figure 4C:
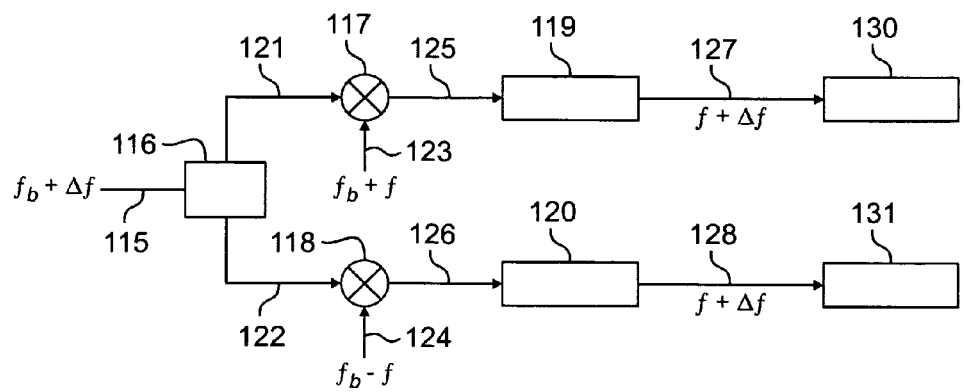
FIG. 4C shows a configuration for canceling a measuring band in the negative direction in a two-way heterodyne interferometer.

FIG. 4C shows an embodiment of the two-way heterodyne technique. A signal splitter 116 splits a measured signal 115 into two signals 121 and 122. Two mixers 117 and 118 multiply the split signals 121 and 122 by a local oscillation signal 123 whose frequency is $f_b+f$ and a local oscillation signal 124 whose frequency is $f_b-f$, respectively. Where, $f_b$ means a beat frequency.

Radio frequency components of outputs 125 and 126 of the mixers are eliminated by filters 119 and 120. The filters respectively output a signal 127 having a frequency $f+\Delta f$ and a signal 128 having a frequency $f-\Delta f$. Phase measurers 130 and 131 measure Doppler frequency. If the signal 127 whose frequency is $f+\Delta f$ and a measured value of the phase measurer 130 are used when the Doppler frequency has the positive sign and the signal 128 whose frequency is $f-\Delta f$ and a measured value of the phase measurer 131 are used when it has the negative sign, a band in the positive direction is used all the time so that the same band can be used irrespective of the sign of the Doppler frequency. Since the two phase measurers 130 and 131 are employed, the phase measurers are changed when the movement direction of the object is varied, and phase values of the phase measurers are exchanged when the phase measurers are changed, so as to prevent loss of phase even when a measuring direction is varied.

The heterodyne interferometer is a well-known displacement measuring device widely used. Accordingly, constitutions and methods, which are not included in the claims of the present invention, can be easily embodied by those skilled in the art from the well-known heterodyne interferometer so that detailed explanation for them is omitted.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A heterodyne laser interferometer, comprising:

a heterogeneous mode helium-neon laser light source for generating a light beam having two frequency components that are linearly polarized and perpendicular to one another;

an optical interferometer coupled to receive a first portion of the light beam from the laser light source and to generate a measured signal therefrom, said first portion including portions of the two frequency components;

a frequency converter coupled to receive the measured signal and a reference signal that is based on the remaining portion of the light beam, said remaining portion including portions of the two frequency components, said frequency converter configured to adjust the frequencies of the measured signal and the reference signal without adjusting their relative phase; and a superheterodyne phase measurer coupled to the frequency converter for measuring a phase of the frequency converted measured signal and the frequency converted reference signal;

a signal splitter for splitting the measured electrical signal into first and second split signals;

a first mixer for multiplying the first split signal by a local oscillation signal having a frequency $f_b+f$ to produce a third signal;

a second mixer for multiplying the second split signal by a local oscillation signal having a frequency $f_b+f$ to produce a fourth signal;

a first filter for eliminating radio frequency components from the third signal to generate a fifth signal having a frequency $f+\Delta f$;

a second filter for eliminating radio frequency components from the fourth signal to generate a sixth signal having a frequency $f-\Delta f$; and wherein the phase measurer is configured to use the fifth signal when a Doppler frequency is positive and the sixth signal when the Doppler frequency is negative.

* * * * *